(12) United States Patent
Maki et al.

(10) Patent No.: US 7,858,067 B2
(45) Date of Patent: Dec. 28, 2010

(54) METHOD FOR PRODUCING ALPHA-ALUMINA PARTICLE

(75) Inventors: Hajime Maki, Niihama (JP); Yoshiaki Takeuchi, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/076,836

(22) Filed: Mar. 10, 2005

(65) Prior Publication Data
US 2005/0201928 A1 Sep. 15, 2005

(30) Foreign Application Priority Data
Mar. 12, 2004 (JP) ............................ 2004-070244

(51) Int. Cl.
*C01F 7/00* (2006.01)
(52) U.S. Cl. ........................................ 423/625; 51/309
(58) Field of Classification Search ................ 423/625; 51/309; 106/3; 438/692, 693; 252/79.1; 501/127
See application file for complete search history.

(56) References Cited

U.S. PATENT DOCUMENTS

| | | | |
|---|---|---|---|
| 3,370,017 A * | 2/1968 | Bergna et al. ................ 516/34 |
| 3,950,507 A * | 4/1976 | Boreskov et al. ............. 423/626 |
| 4,657,754 A | 4/1987 | Bauer et al. |
| 5,462,903 A | 10/1995 | Rousset et al. |
| 6,106,800 A * | 8/2000 | Mohri et al. ................. 423/625 |
| 7,422,730 B2 * | 9/2008 | Wang ......................... 423/111 |
| 2003/0098529 A1 * | 5/2003 | Drumm et al. ............... 264/624 |
| 2003/0185746 A1 | 10/2003 | Kajihara et al. |

FOREIGN PATENT DOCUMENTS

| | | |
|---|---|---|
| EP | 0761600 A | 3/1997 |
| EP | 1262457 A | 12/2002 |
| WO | 00/69790 A | 11/2000 |
| WO | WO 00/69790 A2 | 11/2000 |

OTHER PUBLICATIONS

Bagwell, et al., "Effect of seeding and water vapor on the nucleation and growth of a-Al2O3 from gamma-Al2O3" 1999, no month, J. Am. Ceram. Soc., 82(4), pp. 825-832.*
Sato, T., "Aluminum Hydroxides and Aluminas", *Mineralogy Association Magazine*, vol. 19, No. 1, pp. 21-41 (1989).
Krell, A., et al., "Nanocorundum-Advanced Synthesis and Processing", *Nanostructured Materials*, vol. 11, No. 8, pp. 1141-1153 (1999).
Rajendran, S., et al., "Fabrication of a Fine Grained Alumina Ceramic", *Key Engineering Materials*, vol. 53-55, pp. 462-468 (1991).
Felde, B., et al., "Synthesis of Ultrafine Alumina Powder by Sol-Gel Techniques", *9th Cimtec World Ceramics Congress, Ceramics, Getting into the 2000's - Part B*, pp. 49-56 (1999).
Ye, Y., et al., "Preparation of Ultrafine-α-Al$_2$O$_3$ Powder by Thermal Decomposition of AACH at Low Temperature", *Chinese Journal of Process Engineering*, vol. 2, No. 4, pp. 325-329 (2002).
French Office Action and Search Report dated Oct. 14, 2005.

* cited by examiner

*Primary Examiner*—Steven Bos
(74) *Attorney, Agent, or Firm*—Panitch Schwarze Belisario & Nadel LLP

(57) ABSTRACT

The present invention provides a method of producing an α-alumina particle. The method of producing an α-alumina particle comprises steps of:
(1) heating a mixture containing an amorphous alumina and a pyrolyzable salt at temperature of not less than the temperature at which the pyrolyzable salt is decomposed, and less than the temperature at which the amorphous alumina transforms to α-alumina; and
(2) calcining the resultant under a partial pressure of water vapor of about 600 Pa or less.

16 Claims, No Drawings

METHOD FOR PRODUCING ALPHA-ALUMINA PARTICLE

BACKGROUND OF THE INVENTION

1. Field of the Invention

The present invention relates to a method for producing an α-alumina particle which performs grinding and polishing operations with high efficiency.

2. Description of Related Art

An α-alumina particle is one of aluminum oxides. α-alumina particle has a corundum structure and high hardness, and is widely used as abrasives.

As the method for producing an α-alumina particle, there are known a method comprising a step of calcining an α-alumina precursor such as an aluminum salt and an aluminum alkoxide. (for example, JP-A No. 2003-277048).

Recently, an α-alumina particle is required to perform grinding and polishing operations with high efficiency in view of shortening times for grinding or polishing.

SUMMARY OF THE INVENTION

The present inventors have investigated methods for producing an α-alumina particle which performs grinding and polishing operations with high efficiency, and resultantly completed the present invention.

That is, the present invention provides a method for producing an α-alumina particle comprising steps of:

(1) heating a mixture containing an amorphous alumina and a pyrolyzable salt at a temperature of not less than the temperature at which the pyrolyzable salt is decomposed, and less than the temperature at which the amorphous alumina transforms to an α-alumina; and (2) calcining the resultant under a partial pressure of water vapor of 600 Pa or less.

DETAILED DESCRIPTION OF THE PREFERRED EMBODIMENTS

The method for producing an α-alumina particle of the present invention comprises a step(1) in which the mixture containing an amorphous alumina and a pyrolyzable salt is heated at a temperature of not less than the temperature at which the pyrolyzable salt is decomposed, and less than the temperature at which the amorphous alumina transforms to an α-alumina.

The amorphous alumina used in the method of the present invention has no distinct peak in a X-ray diffraction spectrum measured by a X-ray diffractometer, and is usually in form of particle. The amorphous alumina can transform to an α-alumina, as described hereinafter, and a transformation temperature thereof is usually about 600° C. or more. The amorphous alumina may be obtained, for example, by a method of hydrolyzing an aluminum compound.

The aluminum compound is typically an aluminum salt of acid, or an aluminum alkoxide. The acid is an inorganic acid such as nitric acid, sulfuric acid, carbonic acid and hydrochloric acid, or an organic acid such as oxalic acid, acetic acid, stearic acid, lactic acid and lauric acid. Examples of the aluminum salts include inorganic aluminum salts such as aluminum nitrate, ammonium aluminum nitrate, aluminum sulfate, ammonium aluminum sulfate, aluminum carbonate, ammonium aluminum carbonate, aluminum chloride and ammonium alum; and organic aluminum salts such as aluminum oxalate, aluminum acetate, aluminum stearate, aluminum lactate and aluminum laurate. When an aluminum salt being water-soluble is used, an aqueous solution of the aluminum salt is obtained by mixing the aluminum salt with water. Since the aqueous solution is usually acidic, hydrolysis of the aluminum salt may be carried out by mixing the aluminum salt and a base. For example, the aluminum salt is dissolved in water to obtain an aqueous solution, and then the aqueous solution is mixed with a base to obtain hydrolysate of the aluminum salt. Examples of the base mixed with the aqueous solution include aqueous ammonium carbonate solution, aqueous ammonium bicarbonate solution, aqueous ammonia. The hydrolysis usually gives a slurry containing a hydrolysate and a solvent such as water or the like. When the aluminum salt is hydrolyzed, a seed crystal described hereinafter may be added to the aqueous solution before hydrolysis. When the aqueous solution containing the seed crystal is hydrolyzed by mixing with the base, a slurry containing a hydrolysate homogeneously dispersed with the seed crystal is obtained. A solid is obtained by evaporating a solvent from the slurry or by filtrating the slurry, followed by drying to obtain an amorphous alumina. The obtained amorphous alumina may be further pulverized.

Examples of the aluminum alkoxide includes aluminum isopropoxide, aluminum s-butoxide and aluminum t-butoxide. The aluminum alkoxide, which is usually soluble to organic solvent, may form an aluminum alkoxide solution by mixing the aluminum alkoxide with the organic solvent. Hydrolysis of the aluminum alkoxide is carried out by adding water to the aluminum alkoxide solution. The hydrolysis usually gives a slurry containing a hydrolysate, the organic solvent and water. when the aluminum alkoxide is hydrolyzed, the seed crystal may be added to the aluminum alkoxide solution before hydrolysis. When the aluminum alkoxide solution containing the seed crystal is hydrolyzed by mixing with water, a slurry containing a hydrolysate homogeneously dispersed with the seed crystal is obtained. A solid is obtained by evaporating the organic solvent and water from the slurry or by filtrating the mixture of slurry, followed by drying to obtain an amorphous alumina. The obtained amorphous alumina may be further pulverized.

A pyrolyzable salt used in the present invention is a salt decomposable at less than the temperature at which the amorphous alumina described above transforms to an α-alumina. Examples of the pyrolyzable salts include inorganic ammonium salts such as ammonium nitrate, ammonium sulfate, ammonium sulfite, ammonium bisulfate, ammonium hydrogensulfate, ammonium chloride, ammonium perchlorate, ammonium sulfide, ammonium thiosulfate, ammonium amidosulfate, ammonium carbonate, ammonium bicarbonate and ammonium borate; and organic ammonium salts such ammonium formate, ammonium oxalate, ammonium benzoate, ammonium acetate, ammonium stearate, ammonium lactate, ammonium laurate, ammonium adipate, ammonium alginate and ammonium hydrogen tartrate. An amount of the pyrolyzable salt is usually 100 parts by weight or more, preferably 200 parts by weight or more, and 1000 parts by weight or less, preferably 800 parts by weight or less based on 100 parts by weight of the amorphous alumina.

A mixture of the amorphous alumina and the pyrolyzable salt may be prepared by mixing the amorphous alumina described above and the pyrolyzable salt. A seed crystal may be added to the obtained mixture.

Alternatively, the mixture of the amorphous alumina and the pyrolyzable salt may be prepared by mixing the aluminum salt such as inorganic aluminum salts and organic aluminum salts, with aqueous ammonium to partially hydrolyze the aluminum salt, and then removing water from the resultant.

The obtained mixture is heated. The heating is carried out at a temperature of not less than the temperature at which the pyrolyzable salt is decomposed, and less than the temperature at which the amorphous alumina transforms to an α-alumina. The heating temperature is usually about 100° C. or higher, preferably about 300° C. or higher, further preferably about 350° C. or more, and usually less than about 600° C. The heating (referred to as "pyrolysis" hereinafter,) may be carried out under the following conditions that a heating-rate from normal temperature to decomposition temperature of the pyrolyzable salt is usually about 50° C./hour or more, preferably about 100° C./hour or more, and usually about 1000° C./hour or less, preferably about 500° C./hour or less; pyrolysis time is usually about 10 minutes or more, preferably about 30 minutes or more, and usually about 24 hours or less, preferably about 10 hours or less. The pyrolysis may be carried out by using, for example, tubular electric furnace, box-type electric furnace, tunnel furnace, far-infrared furnace, micro-wave furnace, shaft furnace, reflection furnace, rotary furnace and Roller Hearth furnace. Due to gas generation from the pyrolyzable salt in the pyrolysis, the pyrolysis is preferably carried out with discharging the gas, or passing through an inert gas such as nitrogen and argon. When a seed crystal is used, the seed crystal may be added with a mixture obtained by the pyrolysis.

The present invention comprises further a step (2) of calcining the resultant of step (1) or optional step for preparing the mixture containing an amorphous alumina and a pyrolyzable salt as described above.

The calcination is carried out under the condition of partial pressure of water vapor of 600 Pa or less (dew point: 0° C. or less in case atmospheric total pressure is 0.1 MPa), preferably 165 Pa or less (dew point: −15° C. or less), more preferably 40 Pa or less (dew point: −30° C. or less). The calcination may be carried out under atmosphere of air or inert gas such as nitrogen and argon as long as the atmosphere sufficiently satisfies the condition of the partial pressure of water vapor described above. Furthermore, the calcination may be carried out under any of normal pressure (1 atm), pressured atmosphere or reduced atmosphere. The calcination temperature is not less than the temperature at which the amorphous alumina transforms to an α-alumina. The calcination temperature is usually 600° C. or higher, preferably 700° C. or higher, and usually 1000° C. or lower, preferably 950° C. or lower. The heating-rate to the temperature at which the amorphous alumina transforms to an α-alumina is usually about 50° C./hour or more, preferably about 100° C./hour or more, and about 1000° C./hour or less, preferably about 500° C./hour or less; and calcination time is usually about 10 minutes or more, preferably about 30 minutes or more, and usually about 24 hours or less, preferably about 10 hours or less.

The calcination may be carried out by using, for example, tubular electric furnace, box-type electric furnace, tunnel furnace, far-infrared furnace, micro-wave furnace, shaft furnace, reflection furnace, rotary furnace and a Roller Hearth furnace. Due to possibility of water generated from the amorphous alumina in the calcination, the calcination is usually carried out by using a pass through-type furnace in which a gas adjusted in the partial pressure of water vapor being introduced along with simultaneously purging the gas from the furnace. In case the partial pressure of water vapor in the calcination atmosphere is kept at 600 Pa or less, the calcination is allowed to carry out by using a sealed-type furnace.

The calcination is preferably carried out in the presence of a seed crystal. The seed crystal is, for example, a particle made of α-alumina, diaspore, iron oxide, chromium oxide or titanium oxide. The seed crystal has a BET specific surface area of usually about 12 $m^2/g$ or more, preferably about 15 $m^2/g$ or more, and usually about 150 $m^2/g$ or less, preferably about 50 $m^2/g$ or less. An amount of the seed crystal is usually about 1% by weight or more, preferably about 2% by weight more, more preferably about 5% by weight or more, and usually about 50% by weight or less, preferably about 30% by weight or less, based on the mixture containing an amorphous alumina and a pyrolyzable salt. The seed crystal is further preferably subjected to pulverizing.

The α-alumina particle obtained by the production method described above has an α-ratio of about 90% or more, preferably about 95% or more and average primary particle diameter of about 10 nm or more and about 200 nm or less. The α-alumina particle performs grinding and polishing operations with high efficiency.

EXAMPLES

The present invention is described in more detail by following Examples, which should not be construed as a limitation upon the scope of the present invention.

The properties of an α-alumina and a seed crystal were evaluated by the following methods.

(1) α-Ratio

It is calculated according to the following formula (i) using the peak strength $I_{25.6}$ at 2θ=25.6°, which is corresponding to a peak intensity of α-alumina (012) and the peak strength $I_{46}$ at 2θ=46°, which is corresponding to a peak intensity of transition alumina other than α-alumina, from a diffraction spectrum measured under conditions of radiation source: CuKα beam, 40 kV×20 mA, monochromator: graphite, by using a powder X-ray diffractometer $$\alpha\text{-ratio}=I_{25.6}/(I_{25.6}+I_{46})\times 100(\%) \qquad (i)$$

(2) Average Primary Particle Diameter

From a transmission electro micrograph of α-alumina powder, the maximum diameter along constant direction of each primary particle of any 20 or more particles was measured, and an average value of measured values was calculated.

(3) BET Specific Surface Area

It was measured by using specific surface area analyzer (trade name "FLOWSORB II 2300", manufactured by Shimadzu Corporation) with a nitrogen adsorption method.

(4) Relative Grinding Rate

Fifty (50) g of sample and 5.4 Kg of alumina medium having a diameter of 15 mm were put into a vibrating mill having an inner volume of 3.3 L, followed by operating the vibrating mill for 12 minutes and then recovering an α-alumina particle. 2 parts by weight of the α-alumina particle was mixed with 98 parts by weight of water to obtain a suspension. A monocrystal ferrite was ground by being continuously fed with the suspension. A reduced thickness of the monocrystal ferrite per unit time in the operation was measured. The relative grinding rate was estimated by a value of the measured grinding rate (=reduced thickness per unit time) relative to the grinding rate of a high purity alumina (trade name "AKP-20", manufactured by Sumitomo Chemical Co., Ltd.), and represented by letting the grinding rate of the high purity alumina be 100.

(5) Dispersibility

One (1) part by weight of sample was mixed with 95 parts by weight of water and 0.01 parts by weight of dispersant (trade name: "SN Dispersant 5468", manufactured by Sannopco Ltd.) to obtain a slurry; the slurry was dispersed by a medium agitation mill (trade name: "¼G single cylinder type SandGrinder", manufactured by Aimex Co., Ltd.) with the following conditions:

medium: zirconia bead having a diameter of 0.65 mm,
agitation speed: 2000 rpm
retention time: 30 minutes.

An average particle diameter of the sample subjected to dispersion treatment was measured by using a particle size distribution analyzer (trade name: "Microtrac", manufactured by Nikkiso Co., LTD.) to be used as an index of dispersibility. The smaller the average particle diameter is, the more superior the dispersibility is.

Example 1

Preparation of Seed Crystal Slurry

The aluminum hydroxide was obtained by hydrolyzing an aluminum isopropoxide, followed by pre-calcination to obtain a intermediate alumina in which the major crystal phase was θ phase and 3% by weight of α phase was contained, and then the intermediate alumina was ground by a jet mill to obtain a powder having a bulk density of 0.21 g/cm$^3$.

The powder obtained was calcined by a furnace filled with an air of −15° C. of dew point (partial pressure of water vapor 165 Pa) in the following conditions:
mode: continuous feeding and discharging,
average retention time: 3 hours,
maximum temperature: 1170° C., then α-alumina powder having a BET specific surface area of 14 m$^3$/g was obtained.

Hundred (100) parts by weight of the α-alumina powder and 1 part by weight of a propylene glycol as a pulverizing agent were charged into a vibration mill to pulverize the α-alumina powder in the following conditions:
medium: alumina beads having a diameter of 15 mm
retention time: 12 hours, consequently, a seed crystal having a BET specific surface area of 17.2 m$^3$/g, and average particle diameter of 0.1 μm was obtained.

In 150 g of 0.01 mole/L aqueous aluminum nitrate solution, 37.5 g of the seed crystal dispersed to obtain a slurry. In a plastic vessel having inner volume of 1 L, the slurry and 700 g of alumina bead having a diameter of 2 mm were charged into, and then agitated. The content of the vessel was taken out to remove the alumina bead by filtration, then the seed crystal slurry was obtained.

[Preparation of Mixed Powder]

750.26 g (2 moles) of aluminum nitrate nonahydrate (Al(NO$_3$)$_3$.9H$_2$O)(manufactured by Kansai Catalyst Co., Ltd., reagent grade, appearance: powder) was dissolved in 1555.7 g of water to obtain an aluminum nitrate solution. The aluminum nitrate solution was added with 56.67 g of seed crystal described above (11.33 g in terms of Al$_2$O$_3$), and then further added under agitation at a room temperature with 340.46 g of 25% aqueous ammonium (manufactured by Wako Pure Chemical Industries, Ltd., special reagent grade), that is 85.12 g (5 moles) in terms of NH$_3$, at the feed rate of 32 g/minute by a micro rotary pump to obtain a mixture. The mixture obtained had a pH of 3.8. The mixture was maintained at a room temperature, followed by drying at 60° C., then pulverized with a mortar to obtain a mixed powder. The mixed powder contained 85 g (in terms of Al$_2$O$_3$) of amorphous alumina, 390 g (in terms of NH$_4$NO$_3$) of ammonium nitrate(pyrolysis temperature: about 330° C.), 71 g (in terms of Al(NO$_3$)$_3$) of aluminum nitrate(pyrolysis temperature: about 150° C.) and the seed crystal. The amount of the seed crystal in terms of Al$_2$O$_3$ was 10 parts by weight per 100 parts by weight of the mixed powder.

[Pyrolysis]

The mixed powder was pyrolyzed by using a rotary furnace (manufactured by Takasago Industry Co., Ltd.) having inner volume of 79 L in the following conditions:
mode: continuous feeding, continuous discharging,
feed rate of powder: 30 g/minute,
furnace temperature
inlet: 390° C.
outlet: 490° C.,
feed rate of gas: 10 normal L-nitrogen(N$_2$)/minute, The pyrolysis was carried out after the inside atmosphere of the furnace was replaced with nitrogen gas.

[Calcination]

The powder discharged from the rotary furnace was put in a crucible made of alumina, followed by putting the crucible in the furnace. Thereafter, under the air having a partial pressure of water vapor of 13 Pa being passing through the furnace, the powder was heated up to 940° C. at the temperature raising rate of 300° C./hour, followed by maintaining at 940° C. for 3 hours to calcine. The properties of the α-alumina particle are shown in Table 1.

Example 2

The same operation as in Example 1 was conducted excepting that the amount of the seed crystal was changed to 218.57 g (43.71 g in terms of Al$_2$O$_3$), and the amount of aqueous ammonia was changed to 40 g (10 g in terms of NH$_3$) in the preparation of mixed powder, and the temperature was changed to 920° C. in the calcination. The properties of the α-alumina particle are shown in Table 1.

In this Example, the amount of seed crystal was 30 parts by weight per 100 parts by weight of the mixed powder.

Comparative Example 1

The same operation as in Example 1 was conducted excepting that the partial pressure of water vapor in the calcination atmosphere was changed to 1200 Pa. The properties of the α-alumina particle are shown in Table 1.

Comparative Example 2

The aluminum hydroxide was obtained by hydrolyzing an aluminum isopropoxide, followed by drying, pre-calcination and then pulverizing to obtain an alumina powder in which the major crystal phase was θ phase and 3% by weight of α phase was contained.

100 g of the alumina powder obtained was charged into a tubular furnace (manufactured by Motoyama Co., Ltd.) having inner volume of 8 L. Thereafter, under the air having a partial pressure of water vapor of 165 Pa being passing through the furnace at a rate of 1 normal L-air/minute, the alumina powder was heated up to 1170° C., followed by maintaining at 1170° C. for 3 hours to calcine, and then an α-alumina particle was obtained. The properties of the α-alumina particle are shown in Table 1.

TABLE 1

| | Properties of α-Alumina Particle | | | |
| --- | --- | --- | --- | --- |
| | Example 1 | Example 2 | Comparative example 1 | Comparative example 2 |
| α-ratio (%) | 97.3 | 97.0 | 97.3 | 98.0 |
| Particle diameter (μm) | 107 | 85 | 102 | — |

TABLE 1-continued

Properties of α-Alumina Particle

| | Example 1 | Example 2 | Comparative example 1 | Comparative example 2 |
|---|---|---|---|---|
| BET specific surface area (m$^3$/g) | 16.8 | 20.3 | 16.8 | 16.0 |
| Relative grinding rate (%) | 211 | 415 | 135 | 100 |
| Dispersibility (μm) | 0.173 | 0.184 | 0.198 | 0.188 |

What is claimed is:

1. A method of producing an α-alumina particle comprising the following steps (1) and (2):
   (1) pyrolyzing a mixture containing an amorphous alumina and a pyrolyzable salt by heating for a time and at a temperature such that the pyrolyzable salt is decomposed, but less than a temperature at which the amorphous alumina transforms to α-alumina, wherein the pyrolysis is carried out with discharging before step (2) gas generated from the pyrolyzable salt; and
   (2) calcining the pyrolyzed mixture of step (1) under a partial pressure of water vapor of about 600 Pa or less.

2. The method according to claim 1, which further comprises a step of preparing the amorphous alumina by hydrolysis of an aluminum salt.

3. The method according to claim 2, wherein the hydrolysis is carried out by mixing the aluminum salt with a base.

4. The method according to claim 2, which further comprises a step of removing water from the amorphous alumina.

5. The method according to claim 1, wherein the pyrolyzable salt is at least one selected from the group consisting of an inorganic ammonium salt and an organic ammonium salt.

6. The method according to claim 5, wherein the inorganic ammonium salt is at least one selected from the group consisting of ammonium nitrate, ammonium sulfate, ammonium sulfite, ammonium bisulfate, ammonium hydrogensulfate, ammonium chloride, ammonium perchlorate, ammonium sulfide, ammonium thiosulfate, ammonium amidosulfate, ammonium carbonate, ammonium bicarbonate, and ammonium borate.

7. The method according to claim 5, wherein the organic ammonium salt is at least one selected from the group consisting of ammonium formate, ammonium oxalate, ammonium benzoate, ammonium acetate, ammonium stearate, ammonium lactate, ammonium laurate, ammonium adipate, ammonium alginate and ammonium hydrogen tartrate.

8. The method according to claim 1, wherein an amount of the pyrolyzable salt is about 100 to 1000 parts by weight per 100 parts by weight of the amorphous alumina.

9. The method according to claim 1, wherein the calcination is carried out in the presence of a seed crystal.

10. The method according to claim 9, wherein the seed crystal has a BET specific surface area of about 12 m$^2$/g or more.

11. The method according to claim 9, wherein an amount of the seed crystal is from about 1% by weight to about 50% by weight based on the mixture containing an amorphous alumina and a pyrolyzable salt.

12. The method according to claim 1, wherein the calcination temperature is about 600° C. to 1000° C.

13. A method of producing an α-alumina particle comprising the following steps (1) and (2):
   (1) pyrolyzing a mixture containing an amorphous alumina and a pyrolyzable salt by heating at a temperature of not less than about 100° C. and less than about 600° C., wherein the pyrolysis is carried out with discharging before step (2) gas generated from the pyrolyzable salt; and
   (2) calcining the pyrolyzed mixture of step (1) under a partial pressure of water vapor of about 600 Pa or less.

14. The method according to claim 3, which further comprises a step of removing water from the amorphous alumina.

15. The method according to claim 1, wherein the step (2) of calcining the pyrolyzed mixture of step (1) is performed under an atmosphere of air or inert gas.

16. The method according to claim 13, wherein the step (2) of calcining the pyrolyzed mixture of step (1) is performed under an atmosphere of air or inert gas.

* * * * *